(12) United States Patent
Neiser et al.

(10) Patent No.: US 9,199,799 B2
(45) Date of Patent: Dec. 1, 2015

(54) FLOW CONTROL CONVEYOR

(71) Applicant: Intelligrated Headquarters, LLC, Mason, OH (US)

(72) Inventors: Raymond R. Neiser, Batavia, OH (US); Brian J. Resnick, Cincinnati, OH (US)

(*) Notice: Subject to any disclaimer, the term of this patent is extended or adjusted under 35 U.S.C. 154(b) by 186 days.

(21) Appl. No.: 13/975,180

(22) Filed: Aug. 23, 2013

(65) Prior Publication Data

US 2014/0172155 A1 Jun. 19, 2014

Related U.S. Application Data

(60) Provisional application No. 61/692,862, filed on Aug. 24, 2012.

(51) Int. Cl.
*G06F 7/00* (2006.01)
*B65G 43/00* (2006.01)
*B65G 43/08* (2006.01)
*B65G 47/68* (2006.01)

(52) U.S. Cl.
CPC ............... *B65G 43/00* (2013.01); *B65G 43/08* (2013.01); *B65G 47/681* (2013.01); *B65G 47/684* (2013.01)

(58) Field of Classification Search
None
See application file for complete search history.

(56) References Cited

U.S. PATENT DOCUMENTS 7,909,155 B2 * 3/2011 Lupton et al. ............... 198/357

OTHER PUBLICATIONS

International Search Report and Written Opinion dated Oct. 24, 2013 for Application No. PCT/US2013/056508.

* cited by examiner

*Primary Examiner* — Yolanda Cumbess

(57) ABSTRACT

The discharge case length rate of a collector conveyor is controlled to provide a more consistent case length rate to the infeed of a downstream conveyor, such as a singulator conveyor, to control or maintain a desired case length rate at the exit of the collector conveyor without stopping the infeed conveyors. The discharge case feet rate accounts for the requirements of downstream devices, such as accounting for trailing gap requirements of a sortation conveyor disposed downstream of a singulator conveyor feed by a conveyor system constructed in accordance with this aspect of the present invention.

29 Claims, 7 Drawing Sheets

FLOW CONTROL CONVEYOR

CROSS REFERENCE TO RELATED APPLICATIONS

This is a non-provisional of, and claims the benefit of, U.S. provisional patent application 61/692,862, filed on Aug. 24, 2012 and having the same title and inventors as listed above. The disclosure of that application is hereby incorporated by reference in its entirety.

BACKGROUND

1. Technical Field

This disclosure relates generally to controlling case length rates in material handling conveyors.

2. Description of Related Art

A singulator conveyor is an example of a conveyor that accepts clustered (overlapping, non-single file) case flow. A trash conveyor is another example. A singulator conveyor discharges the cases in a single file stream. A singulator conveyor works best when the case length rate (cumulative length of cases per unit time, which may be expressed in units of case feet per minute, or CFPM) of the incoming cases matches the case length rate of the outgoing cases. However this does not mean that the instantaneous incoming case length rate needs to match the instantaneous outgoing case length rate. To illustrate, a singulator conveyor must travel 24" to induct two side-by-side 24" long cases (48 case-inches) at the receiving end (two case-inches per conveyor-inch). Because it discharges cases in a single file stream, the singulator conveyor can only discharge 24 case-inches (one case-inch per conveyor-inch) during the same time period that it receives the 48 case inches. So there must be a period of time when the incoming rate is less than the maximum outgoing rate to allow recovery. For the best performance, the average incoming/outgoing case length rates are matched, averaged over a period of time, on a rolling basis.

When the average incoming case length rate exceeds the average outgoing case length rate capacity, i.e., overfeeding, there are excess cases which are overlapping. Overlapping cases must be recirculated, thereby reducing the efficiency of the singulator conveyor. Recirculated cases add to the incoming load on the singulator conveyor. When the average incoming case length rate is less than the average outgoing case length rate capacity of the singulator conveyor, i.e., underfeeding, case throughput is not maximized, and capacity goes unused. Reaching the maximum useful output capacity of a singulator conveyor requires that the average case feet rate delivered by the conveyor system upstream of the singulator conveyor match the outgoing average case length rate of the singulator conveyor.

BRIEF SUMMARY

Disclosed herein are a method, controller and material handling system in which the discharge case length rate of a collector conveyor (i.e., one fed by a plurality of infeed conveyors) is controlled to match (not overfeed nor appreciably underfeed, on a long term basis) the infeed case length rate of a downstream conveyor system, such as a singulator conveyor, and to provide a more consistent case length rate than found in the prior art to the infeed of the downstream conveyor. Additionally, a desired case length rate at the exit of a collector conveyor can be controlled or maintained without stopping the infeed conveyors, and a discharge case feet rate can be set to account for the requirements of downstream devices. This can include accounting for trailing gap requirements of a sortation conveyor disposed downstream of a singulator conveyor feed by a conveyor system constructed in accordance with this aspect.

According to one aspect, the present disclosure provides a method for controlling inputs to a collector conveyor. A controller determines a desired case length rate for the collector conveyor. The controller determines, for a controlled input from the inputs to the collector conveyor, a desired case length rate based on the desired case length rate for the collector conveyor and case length rate information for one or more other inputs to the collector conveyor. The controller determines, for the controlled input, a set speed for delivering cases to the collector conveyor at the desired case length rate determined for the collector conveyor. The controller operates the controlled input at the set speed determined for the controlled input, wherein the set speed determined for the controlled input is different than nominal speed for the controlled input.

According to another aspect, the present disclosure provides a controller to control inputs to a collector conveyor via an interface in communication with a controlled input to the collector conveyor. At least one processor controls the controlled input via the interface by performing operations to determine a desired case length rate for the collector conveyor, to determine a desired case length rate for the controlled input based on the desired case length rate for the collector conveyor and case length rate information for one or more other inputs to the collector conveyor, to determine a set speed for delivering cases to the collector conveyor at the desired case length rate determined for the collector conveyor, and to operate the controlled input at the set speed determined for the controlled input, wherein the set speed determined for the controlled input is different than nominal speed for the controlled input.

According to a further aspect, the present disclosure provides a material handling system with a collector conveyor. A controller is in communication with a controlled input to the collector conveyor to perform operations to determine a desired case length rate for the collector conveyor, to determine a desired case length rate for the controlled input based on the desired case length rate for the collector conveyor and case length rate information for one or more other inputs to the collector conveyor, to determine a set speed for delivering cases to the collector conveyor at the desired case length rate determined for the collector conveyor, and to operate the controlled input at the set speed determined for the controlled input, wherein the set speed determined for the controlled input is different than nominal speed for the controlled input.

The above presents a general summary of several aspects of the disclosure in order to provide a basic understanding of at least some aspects of the disclosure. The above summary contains simplifications, generalization and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The accompanying drawings, which are incorporated in and constitute a part of this specification, illustrate embodiments of aspects of the disclosed technology, and, together with the general description of the invention given above, and the detailed description of the embodiments given below, serve to explain the principles of the disclosed technology.

It will be appreciated that, for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
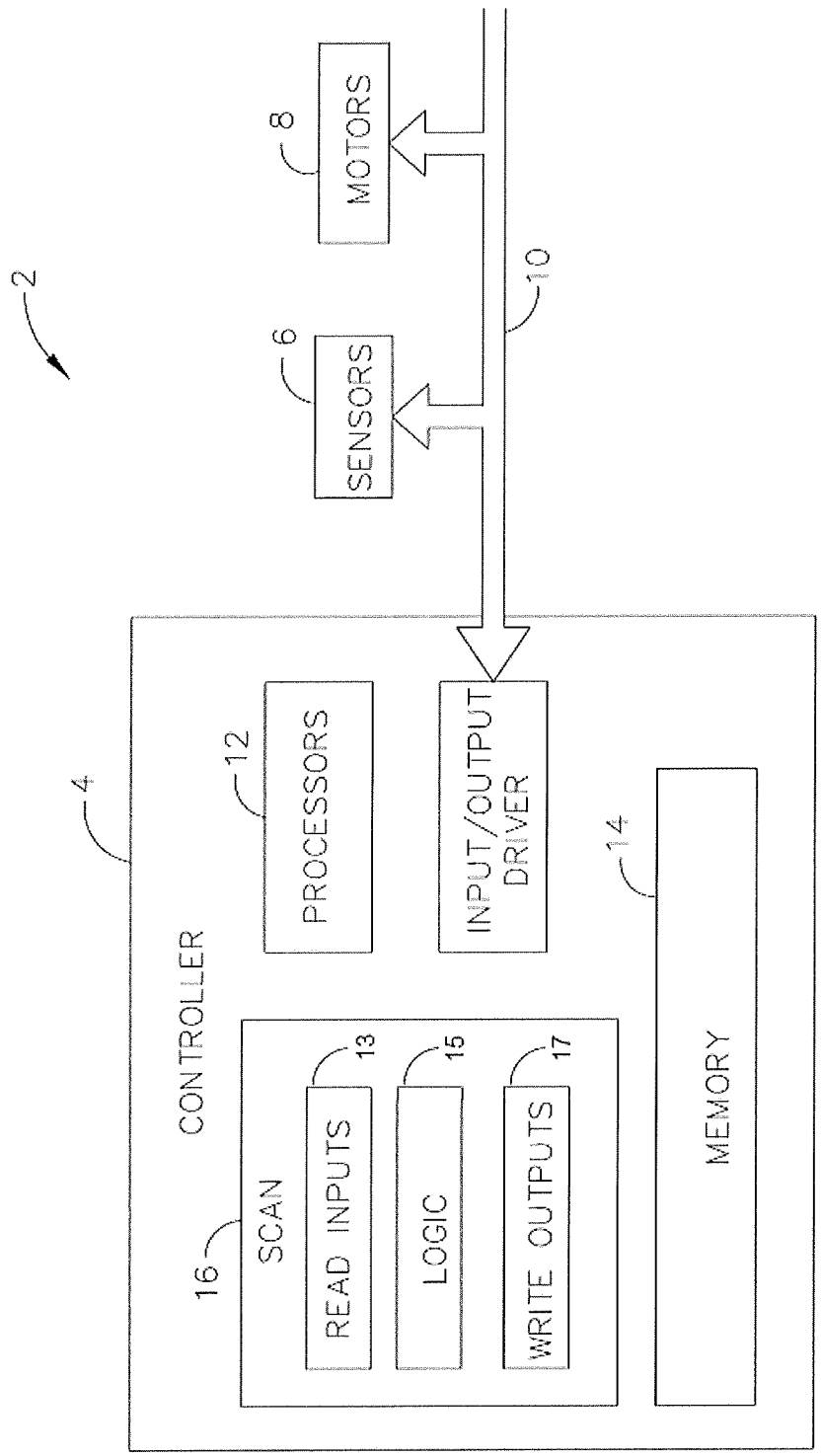
FIG. 1 illustrates a schematic block diagram of components of a material handling system, including sensors and a controller according to one or more aspects.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

In this detailed description, like reference characters designate like or corresponding parts throughout the several views. Also, in this detailed description, it is to be understood that terms such as front, back, inside, outside, and the like are words of convenience and are not to be construed as limiting terms. Terminology used in this document is not meant to be limiting insofar as devices described herein, or portions thereof, may be attached or utilized in other orientations. While case feet is used herein to describe case length, it is to be understood that any unit measure may be used. While minutes are used herein in reference to a unit of time it is to be understood that any time unit may be used. While rate is expressed herein as per minute, it is to be understood that any unit of time may be used and that the length of the unit of time of a rate does not indicate that the rate is taken over that length of time. While case feet per minute is used herein to express case length rate, it is to be understood that case length rate is not limited to such units and that CFPM is a reference to case length rate generally. Referring in more detail to the drawings, an embodiment of the invention will now be described.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts, with like numerals denoting like components throughout the several views. However, it will be apparent to those skilled in the art that these concepts may be practiced without these specific details. In some instances, well known structures and components are shown in block diagram form in order to avoid obscuring such concepts.

In FIG. 1, a material handling system 2 includes a variety of components, including a controller 4, one or more sensors 6, and one or more motors 8. In the material handling system 2 of FIG. 1, the controller 4 is in communication with the one or more sensors 6 and the one or more motors 8 via an external communication bus 10 to perform operations that include controlling inputs to a collector conveyor according to one or more aspects of the present disclosure. In an exemplary aspect, the one or more motors 8 are variable frequency drives (VFDs) and the inputs to the collector conveyor may include one or more controlled infeed conveyors and may also include one or more recirculation lines. The controller 4 determines a desired case length rate for the collector conveyor. The controller 4 determines, for a controlled input of the inputs to the collector conveyor, a set speed for delivering cases to the collector conveyor based on the desired case length rate for the collector conveyor and case length rate information for one or more other inputs to the collector conveyor. The controller 4 operates the controlled input at the set speed determined for the controlled input. This set speed determined for the controlled input can be different than nominal speed for the controlled input. Alternatively or in addition, the controller 4 determines a modified speed for the controlled input and operates the controlled input at the modified speed. The controller 4 could also read inputs, such as from sensors 6, into one or more input registers, perform logic on them as disclosed herein, and write the outputs of that logic, such as to an output buffer, port or other dedicated location for communication to one or more external components such as motors 8.

In one aspect, the controller 4 can be implemented using a computer device. In such an aspect, the controller 4 includes at least one processor 12 for carrying out processing functions associated with one or more of components and functions described herein communicating via an inner communication bus [not pictured in FIG. 1]. Processor 12 can include a single or multiple set of processors or multi-core processors. Moreover, processor 12 can be implemented as an integrated processing system and/or a distributed processing system.

Also, as shown in FIG. 1, a controller 4 can further include memory 14, such as for storing local versions of applications being executed by processor 12. Memory 14 can include any type of memory usable by a computer, such as random access memory (RAM), read only memory (ROM), tapes, magnetic discs, optical discs, volatile memory, non-volatile memory, and any combination thereof. Scan logic, or merely a scan 16 refers to an implementation within the controller 4 wherein the processors 12 repeatedly execute a read input component 13, a solve logic component 15, and a write outputs component 17. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 15 can incorporate IF-THEN-ELSE branching logic, motion control, simple to sophisticated, hardcoded to configured. In a controller 4 such as depicted in FIG. 1, a scan 16 could be used to perform the operations described herein, with inputs such as measured case length rate information being obtained through execution of the read input component 13. The solve logic component 15 could process the inputs, such as by determining a momentary desired case length rate based on the measured case length rate information. The write outputs component 17 could then use the results of the processing to control other components of a material handling system, such as by operating a controlled input to a collector conveyor at a speed determined to deliver cases to the collector conveyor at the momentary desired case length rate.

Further, a controller implemented using a computer device can include a communications component operated according to input/output drivers that provides for establishing and maintaining communications with one or more people or devices utilizing hardware, software, and services as described herein. Communications component may carry communications between components on the computer device, as well as between the computer device and external devices, such as devices located across a communications network and/or devices serially or locally connected to the computer device. For example, communications component may include one or more buses, depicted as the external communication bus 10 and the inner communication bus (not shown in FIG. 1) and may further include transmit chain components and receive chain components associated with a transmitter and receiver, respectively, operable for interfacing with external devices.

Figure 2:
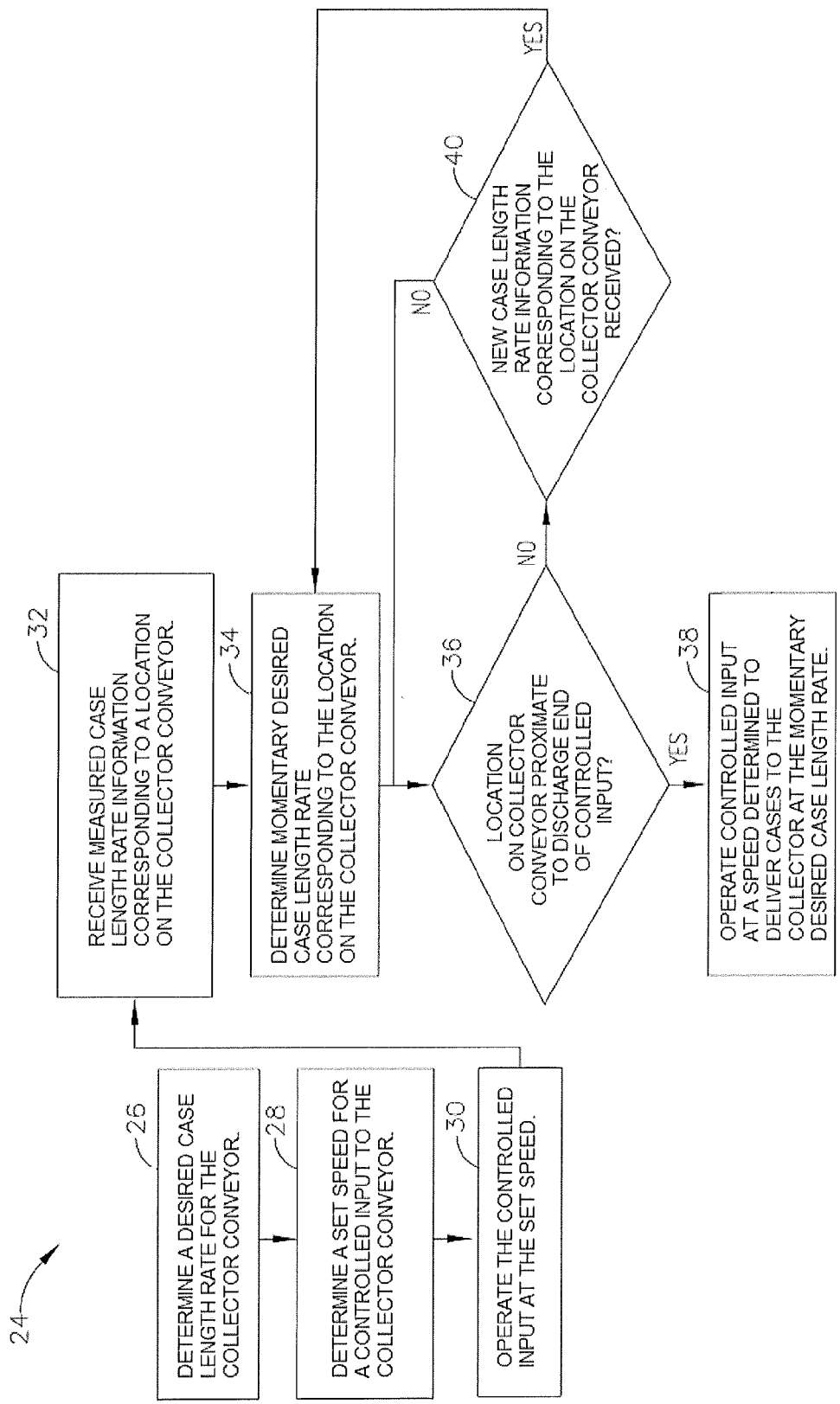
FIG. 2 illustrates a flow diagram of a method for controlling inputs to a collector conveyor according to one or more aspects.

In FIG. 2, a method 24 according to one or more aspects of the present disclosure depicts controlling inputs to a collector conveyor. A controller determines a desired case length rate for a collector conveyor (block 26). A controller determines a set speed for a controlled input to the collector conveyor (block 28). For instance, the set speed could be a set speed for delivering cases to the collector conveyor based on the desired case length rate for the collector conveyor and case length rate information for one or more other inputs to the collector conveyor. As a non-limiting example, where the case length rate information for one or more other inputs is the sum of the expected contribution from each of the other inputs, the set speed could be determined based on the desired case length rate for the collector conveyor and the case length rate information for one or more other inputs to the collector conveyor by adding the expected contribution from the controlled input to the sum of the expected contributions for each of the other inputs, dividing the desired case length rate for the collector conveyor by the resulting figure, then multiplying the result by the nominal speed for the controlled input. After the set speed has been determined (block 28), the controller operates the controlled input at the set speed (block 30). As indicated in the context of FIG. 1, this set speed can be different than nominal speed for the controlled input.

Next, in the method 24 of FIG. 2, the controller receives measured case length rate information corresponding to a location on the collector conveyor (block 32). It then determines a momentary desired case length rate corresponding to the location on the collector conveyor (block 34). This determination can be made, based on a relationship indicated by the measured case length rate information between actual and predetermined case length rates for an input other than the controlled input when the location on the collector conveyor is proximate to a discharge end of the input other than the controlled input. For instance, if the controlled input for which the set speed was determined is the most downstream input to the collector conveyor, a momentary desired case length rate for a section of the collector conveyor can be determined based on a relationship between the actual case length rate at which an upstream input was operating when it was processing the section of the collector conveyor, and a predetermined case length rate for that upstream input. As a non-limiting example, if a desired case length rate of 30 CFPM had previously been determined for the upstream input, and the actual case length rate at which the upstream input was operating when it processed the section of the collector conveyor was 28 CFPM, the momentary desired case length rate corresponding to the section of the collector conveyor could be determined by subtracting difference between actual and desired case length rates for the upstream input (i.e., −2 CFPM) from a previously determined momentary desired case length rate (e.g., if the momentary desired case length rate had previously been set at 30, then it could be changed to 32).

Once the momentary desired case length rate corresponding to the location on the collector conveyor has been determined (block 34), a determination is made as to whether the location on the collector conveyor is proximate to a discharge end of the controlled input (block 36) (e.g., whether it is close enough to the discharge end of the controlled input to be processed by the controlled input). If the location on the collector conveyor is proximate to the discharge end of the controlled input, then the controller operates the controlled input at a speed determined to deliver cases to the collector at the momentary desired case length rate (block 38). The determination of the speed (FPM) a which the controlled input is operated to deliver cases at the momentary desired case length rate ($CFPM_{Momentary}$) can be performed using knowledge of the total case length (CF) on a length (L) of the controlled input according to the formula:

$$FPM = (CFPM_{Momentary} \times L)/CF.$$

The determination can be performed at any suitable time. For example, speed could be determined when the location on the collector conveyor corresponding to the momentary desired case length rate approaches the discharge end of the controlled input. In this type of approach, the controlled input could be operated at the determined speed starting when the speed is determined and extending for a fixed time period (e.g., three seconds) after the speed determination. Alternatively, the speed can be determined directly after the determination of the momentary desired case length rate, regardless of the location on the collector conveyor relative to the discharge end of the controlled input. Other alternatives, such as delaying the speed determination for a set period after the determination of the momentary desired case length rate are also possible, and could be implemented without undue disclosure by one of ordinary skill in the art in light of this disclosure. Accordingly, the discussion above should be treated as illustrative only, and not limiting.

As an alternative to operating the controlled input at a speed determined to deliver cases to the collector at the momentary desired case length rate (block 38), if the location on the collector conveyor is not proximate to the discharge end of the controlled input, an additional determination will be made as to whether new case length rate information corresponding to the location on the collector conveyor has been received (block 40). If no new case length rate information corresponding to the location on the collector conveyor has been received, the method 24 of FIG. 2 can return processing to block 36. Alternatively, if new case length rate information corresponding to the location on the collector conveyor has been received, then the method 24 of FIG. 2 can return processing to block 34 so that a momentary desired case length rate corresponding to the location on the collector conveyor can be determined which accounts for the new case length rate information. As a non-limiting example, consider an embodiment where a collector conveyor has the controlled input and two upstream recirculation lines as inputs, the controlled input is normally operated at a speed consistent with delivering cases to the collector at a rate of 30 CFPM. If the more upstream of the two recirculation lines is operating at a rate which is 2 CFPM greater that its predetermined rate when it processes a section of the collector conveyor, a momentary desired case length rate corresponding to that section of the collector conveyor can be determined by subtracting 2 CFPM from 30 CFPM. If, subsequently, the more downstream of the two recirculation lines processes the section of the collector conveyor while operating at a rate which is 1 CFPM greater than its predetermined rate, a new determination of the momentary case length rate corresponding to that section of the collector conveyor can be made by subtracting 1 CFPM from 28 CFPM. Then, when the section of the collector conveyor is ultimately processed by the controlled input, the controlled input can be operated at a speed determined to deliver cases to the collector at the rate of 27 CFPM.

In some embodiments, a method could continue performing steps such as shown in FIG. 2 even after the controlled input has been operated at the speed determined to deliver cases to the collector at the momentary desired case length rate (block 38). For instance, once the location on the collector conveyor has been processed by the controlled input operating at the speed determined to deliver cases to the collector at the momentary desired case length rate (block 38), the steps of blocks 32, 34, 36, 38 and 40 could be repeated for a location on the collector conveyor which is upstream of the location which was processed by the controlled input. Similarly, one or more of the steps from FIG. 2 could be performed in parallel with each other for different locations on the collector conveyor. For instance, while a location for which a corresponding momentary desired case length rate has been determined is travelling to the discharge end of the controlled input, the acts of receiving measured case length rate information (block 32) and determining a momentary desired case length rate (block 34) could be performed for a more upstream location on the collector conveyor, and the momentary desired case length rates for both locations could be stored (e.g., in a tracking array) for later use in operating the controlled input (block 38).

Other variations on the method 24 of FIG. 2 are also possible. For instance, rather than determining a momentary desired case length rate corresponding to a location on the collector conveyor (block 34) before the location on the collector conveyor was proximate to the discharge end of the controlled input, the information on which that determination would be based could be stored, with the momentary desired case length rate being determined only after the corresponding location was proximate to the discharge end of the controlled input. This type of variation could also be combined with an approach where a momentary desired case length rate is determined before the corresponding location on the collector conveyor is proximate to the discharge end of the controlled input. For instance, there might be some inputs (e.g., uncontrolled inputs) where measured case length information about those inputs will be used as soon as it is received to determine a momentary desired case length rate, while other inputs (e.g., controlled inputs) will have their measured desired case length rate information applied only once the corresponding location is proximate to the discharge end of the collector conveyor. Further variations are also possible, and could be implemented by those of ordinary skill in the art without undue experimentation in light of this disclosure. Accordingly, the above discussion should be understood as being illustrative only, and should not be treated as limiting.

Figure 3:
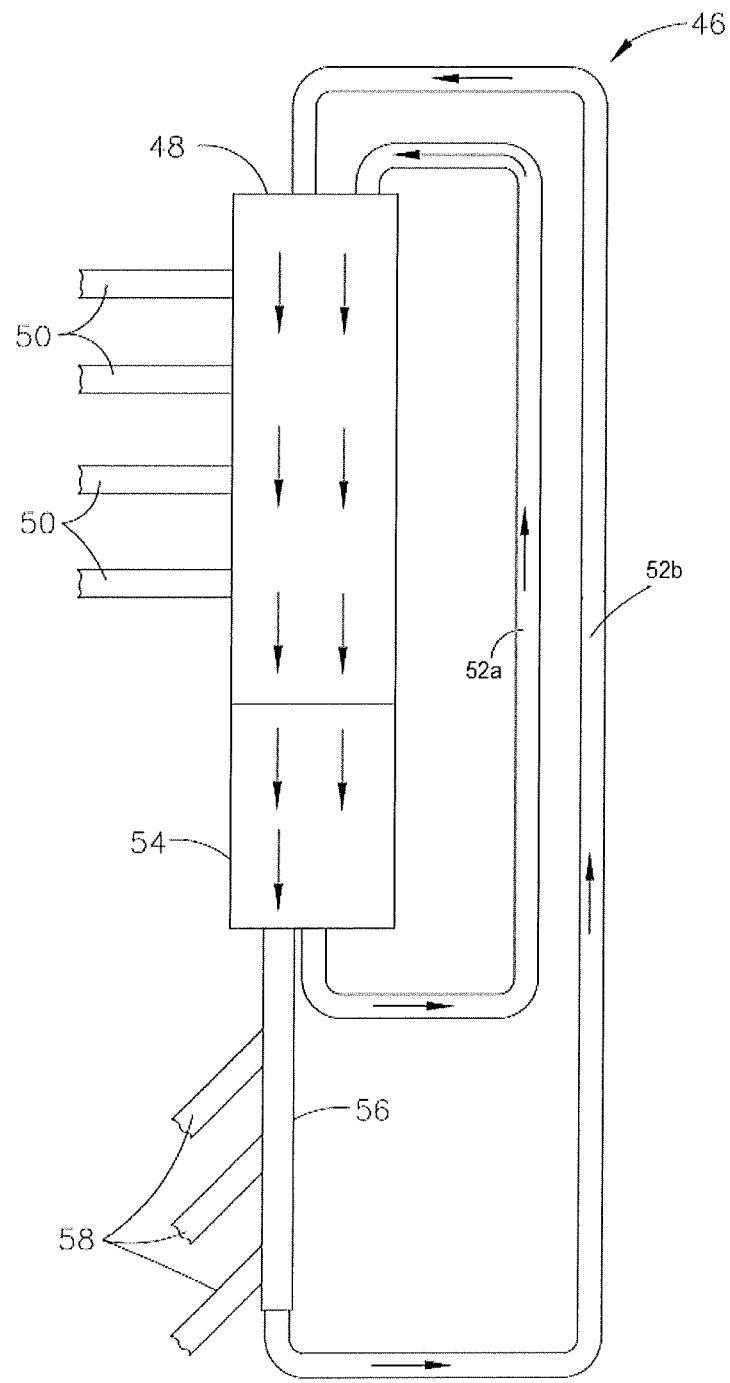
FIG. 3 illustrates a top view diagram of a material handling system comprising a collector conveyor having inputs in the form of multiple infeed conveyors and recirculation lines from a singulator and a sorter according to one or more aspects.

In FIG. 3 a material handling system 46 includes a collector conveyor 48 that receives items from multiple inputs, including infeed conveyors 50 and recirculation lines 52a, 52b from a singulator 54 and a sorter 56. These items are carried by the collector conveyor 48 to a downstream system. The downstream system can be, for example, a singulator 54, though other downstream systems, such as a trash conveyor, could also be used. From the singulator 54, the items can be further carried to other systems, such as one or more sorters 56. From a sorter, the items can be diverted to their destinations, depicted as take-away conveyors 58. Those items which are not singulated by the singulator 54 or which are not diverted by a sorter 56 are taken by the appropriate recirculation line 52a, 52b to the collector conveyor 48.

A controller (not shown in FIG. 3), such as implemented by a computer device (FIG. 1) is in communication with other components of the material handling system 46 to control inputs to the collector conveyor 48. The controller can receive inputs, such as from sensors (not shown in FIG. 3) on the inputs to the collector conveyor 48 (e.g., the infeed conveyors 50). The controller determines a desired case length rate for the collector conveyor 48. This desired case length rate can be the case length rate at which the singulator 54, which is the component directly downstream of the collector conveyor 48 in the material handling system 46 of FIG. 3, is operated. The controller determines, for a controlled input of the inputs to the collector conveyor 48, a set speed for delivering cases to the collector conveyor 48 based on the desired case length rate for the collector conveyor 48 and case length rate information for one or more other inputs to the collector conveyor. The controller operates the material handling system 46, specifically the controlled input, at the set speed determined for the controlled input. In an aspect, the set speed determined for the controlled input is different than nominal speed for the controlled input.

Figure 4:
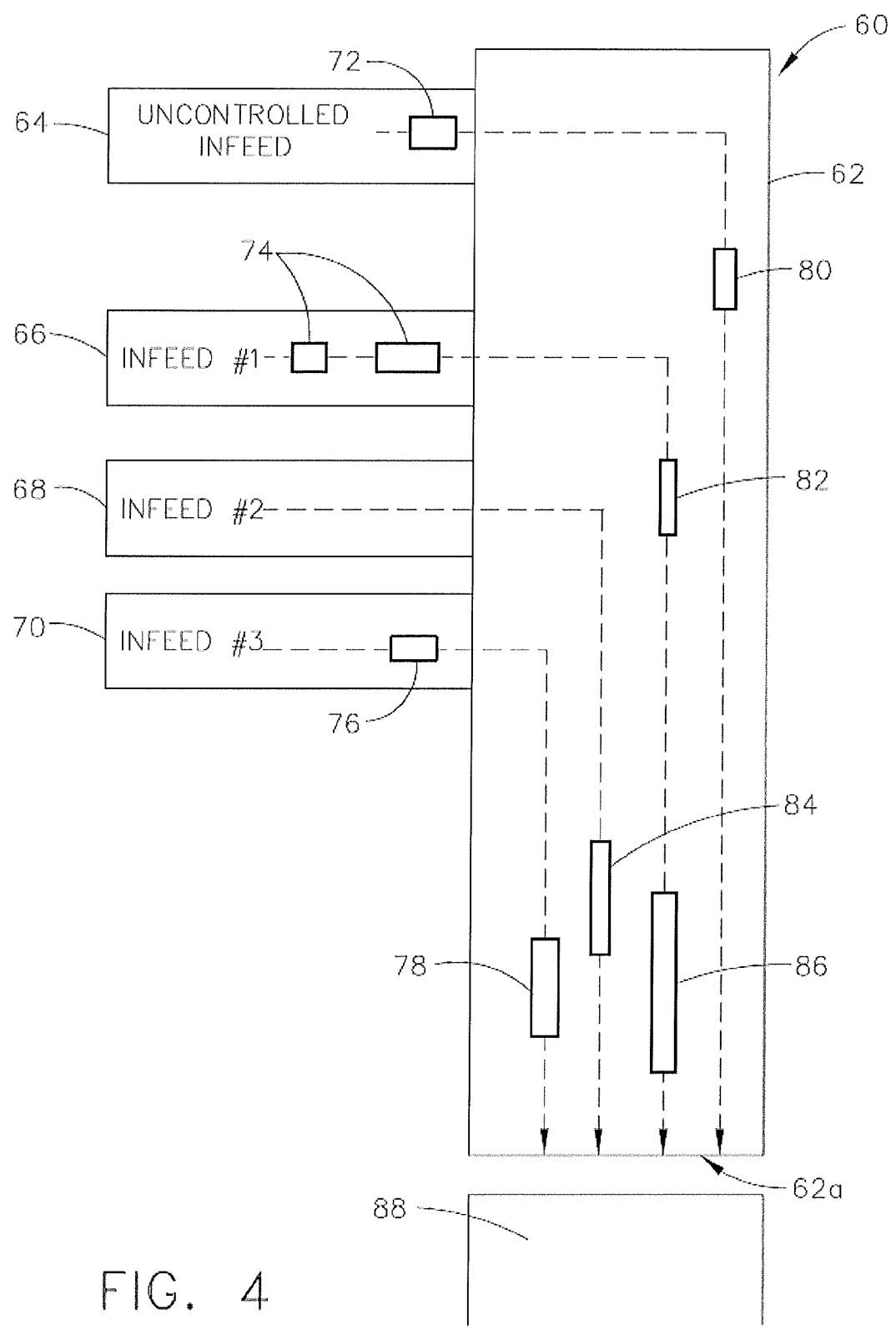
FIG. 4 illustrates a collector conveyor fed by an uncontrolled infeed conveyor and a plurality of controllable infeed conveyors.

FIG. 4 diagrammatically illustrates conveyor system 60 with collector conveyor 62 and infeed conveyors 64, 66, 66 and 70. Infeed conveyor 64 is depicted as an uncontrolled infeed conveyor, it being noted that in some embodiments illustrating the present invention an uncontrolled infeed conveyor is not necessarily present. Infeed conveyors 66, 68 and 70 are depicted as controllable infeed conveyors, with the ability to control the speed, such as by using a VFD. Exemplary cases 72, 74 and 76 are represented diagrammatically on infeed conveyors 64, 66 and 70. Exemplary cases 78, 80, 82, 84 and 86 are represented diagrammatically on collector conveyor 62. Each case 78, 80, 82, 84 and 86 has an associated dashed line which represents from which infeed conveyor the specific case came. For example, case 80 is illustrated as having been deposited onto collector conveyor 62 from infeed conveyor 64, case 78 from infeed conveyor 70. Although the dashed lines appear in a "lane" formation, it will be appreciated that cases are not physically deposited on collector 62 in a lane formation, but rather are deposited in piles. It is noted that each case representation, 72, 74, 76, 78, 80, 82, 84 and 86, may represent a single file case or a group of overlapping non-single cases.

Cases are discharged from collector conveyor 62 at exit 62a onto conveyor 88, such as a singulator conveyor, disposed immediately downstream of collector 62. A typical collector conveyor feeding a singulator conveyor might be 700 feet long.

In one aspect, with knowledge of the expected contribution from each infeed conveyor, and a speed control on each controllable infeed conveyor, the speed of each controllable infeed conveyor can be set ($S_{Set}$) so that the average contributions from all the inputs (e.g., infeed conveyors) sum to the desired case length rate for the collector conveyor. Under this control approach, the respective speed of each controlled infeed conveyor is set as a percentage (SR) of that conveyor's nominal (normal operating) speed, $S_{Nominal}$, based on a relationship between the desired collector rate ($CFPM_{Desired}$) and the sum of the expected case length rates of all controlled infeed conveyors when those conveyors are run at nominal speed ($\Sigma CFPM_{Infeed\ Conveyor\ Expected\ Average}$). The percentage is then multiplied by the respective $S_{Nominal}$ to determine $S_{set}$ for the respective infeed conveyor. As formulas:

$$SR = CFPM_{Desired} / \Sigma CFPM_{Infeed\ Conveyor\ Expected\ Average}$$

$$S_{Set} = SR \times S_{Nominal}$$

If there are any uncontrolled inputs (e.g., uncontrolled infeed conveyors) feeding the collector conveyor, the desired case length rate for the collector conveyor ($CFPM_{Desired}$) in the above formula will preferably be reduced by the sum of the expected case length rates of all uncontrolled inputs. For example, if the inputs to the collector conveyor include two uncontrolled inputs with expected case length rates of 10 and 20 CFPM and two controlled inputs with expected case length rates of 30 and 40 CFPM when operated at nominal speed, and $CFPM_{Desired}$ is 80 CFPM, then SR will be (80−(10+20))/(30+40)=50/70=approximately 71%.

In the preceding aspect, the set speed of each controlled infeed conveyor is described as fixed. In another aspect, the set speed of one or more of the controlled infeed conveyors may be periodically modified so that the actual contribution more closely matches the expected contribution, essentially resulting in the expected average becoming the desired average. In this aspect, the controlled infeed conveyor actual case length rate is monitored, and that information is used to modify the set speed of that conveyor. The actual case length rate of the controlled infeed conveyor may be monitored in many ways, such as for example, by detecting cases at the entrance of the controlled infeed conveyor. The type and sophistication of the sensor system used to monitor case length rate depends on the nature of the case flow: If there is clustered case flow, the sensor system needs to be capable of detecting and distinguishing overlapping cases. Single file case flow requires a less sophisticated sensor system.

With knowledge of the total case length (CF) actually on the controlled infeed conveyor or on a given length of the conveyor (L), and knowledge of the conveyor speed (FPM), the case length rate (CFPM) can be determined according to the formula:

$$CFPM = \frac{FPM \times CF}{L}$$

The maximum and minimum speed capability of the controlled infeed conveyor place range limitations on the calculated conveyor speed and on the results achieved. Other factors that affect performance include the length selected for L and the periodicity of the recalculation, each of which can be set at any suitable value.

In another aspect, the actual contributions from each infeed conveyor is tracked on a collector conveyor and infeed conveyor contributions are modified based on the actual case length on the collector conveyor. By way of example, if, in either of the preceding embodiments, an infeed conveyor were under performing (contributing a lower case length rate than expected) then the actual case length rate on the collector conveyor will be lower than desired, and the collector conveyor will have unused capacity. In this aspect, the unused capacity resulting from an under performing infeed conveyor is allocated to one or more downstream infeed conveyors, allowing their respective contributions to be momentarily increased to utilize the unused capacity. For example, the momentary desired case length rate for an infeed conveyor location might be calculated by summing the desired case length rate for the particular infeed conveyor and all upstream infeed conveyors and subtract the actual case length rate of all upstream infeed conveyors. The length of time for the momentary adjustment may be any suitable length, such as three seconds.

Figure 5:
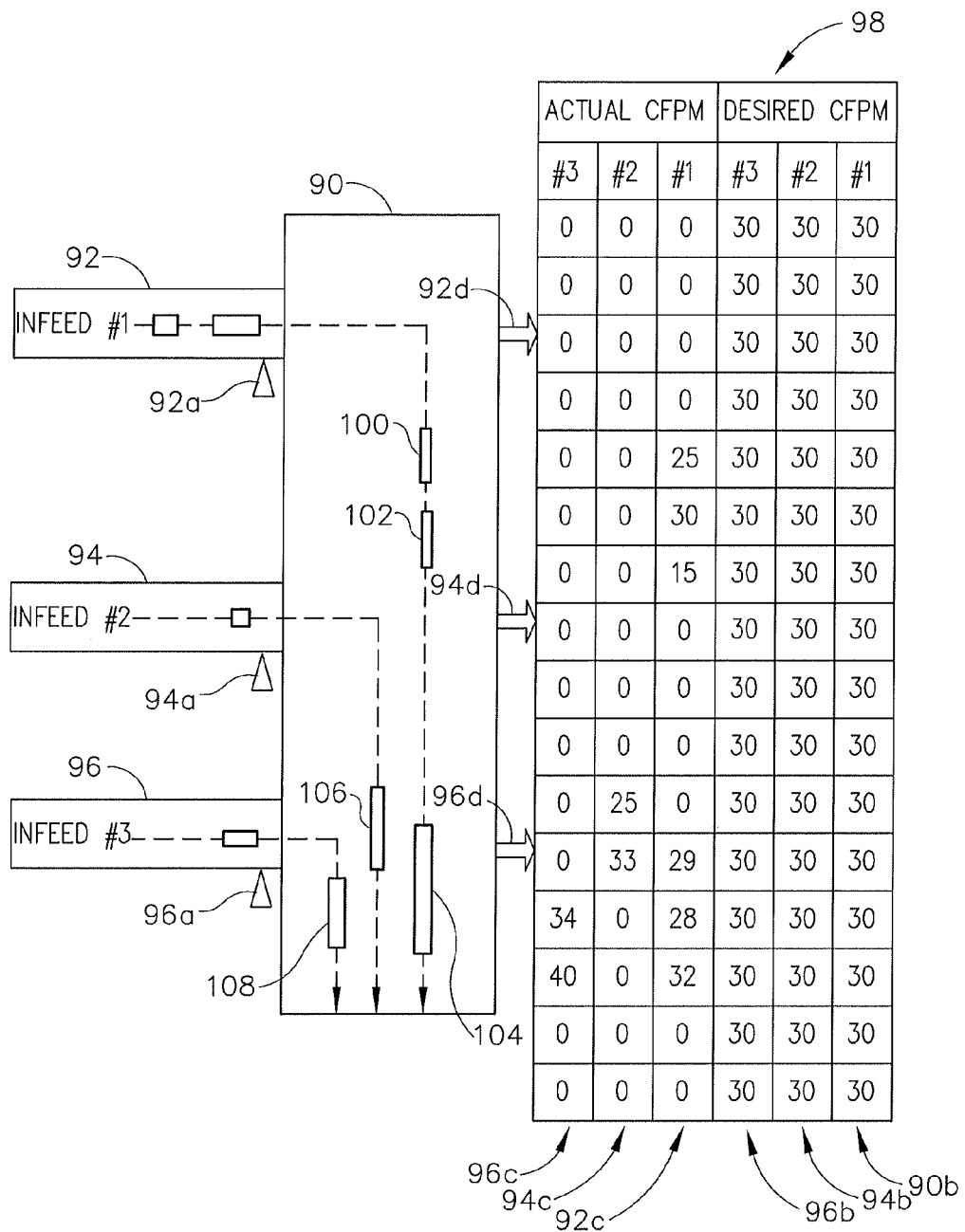
FIG. 5 illustrates a collector conveyor fed by a plurality of controllable infeed conveyors, and an associated tracking array.

One way of tracking such information on the collector conveyor is the well knowing tracking array, which is diagrammatically depicted in FIG. 5. As is well known for a conveyor such as collector conveyor 62 (FIG. 4), a tracking array is a computer model having many elements, each of which representing a tiny section of the conveyor. For an encoder with one inch resolution, each element might represent an inch section. Data is entered into an element which is representative of a physical condition of the corresponding section of the physical conveyor. For each tick of the encoder, the tracking array data is shifted one element at a time downstream. For example, for a 700 foot (8400 inches) long collector, the tracking array might be set to 9000 elements. Assigning element 0 as representing the entrance to the conveyor, element 8400 would be the last element before exit 62a. In the updating process, the data in element 8399 would be copied into element 8400, overwriting the data already there, the data in element 8398 would then be copied into element 8399, and the process repeated down to element 0, which would be initialized.

As a non-limiting example, FIG. 5 illustrates this embodiment. In FIG. 5, collector conveyor 90 has controllable infeed conveyors 92, 94 and 96 discharging cases onto it. Each infeed conveyor 92, 94 and 96, has a respective associated sensor 92a, 94a and 96a, configured to collect data regarding the cases being discharged therefrom onto collector conveyor 90. Any suitable sensor may be used, matched to the type of flow (e.g., clustered case flow, single file case flow). The collection of case length rate information is one type of data collected, which can be collected through one or more sensors, such as sensors that determine a case length and that determine conveyor speed. Case length might also determined based on knowledge of the case ID determined by conventional methods, such as RFID, bar code, etc.

Adjacent the diagrammatic depiction of collector conveyor 90 is a representation of a tracking array, indicated at 98. Array 98 is modeled with a plurality of columns, 92b, 94b, 96b, 92c, 94c, 96c, of individual elements. Each column corresponds to a respective infeed conveyor 92, 94 and 96, with the elements arranged in rows that correspond to locations along the length of collector conveyor 90. Arrow 92d points to the row that infeed conveyor 92 is processing; arrow 94d points to the row that infeed conveyor 94 is processing; and arrow 96d points to the row that infeed conveyor 96 is processing. Collector 90 is illustrated with exemplary case representations 100, 102 and 104 from infeed conveyor 92, exemplary case representation 106 from infeed conveyor 94 and exemplary case representation 108 from infeed conveyor 96. These case representations may represent a single case or a group of overlapping non-single file cases.

Elements of columns 92b, 94b and 96b contain data regarding the desired case length rate of the respective infeed conveyors. In the embodiment exemplified in FIG. 5, the total desired CFPM of collector 90 is 90 CFPM allocated equally over infeed conveyors 92, 94 and 96 at 30 CFPM. Elements of columns 92c, 94c and 96c contain data indicative of the physical condition of the corresponding section of collector conveyor 90 with the column of the element indicating which infeed conveyor 92, 94, 96 contributed to collector conveyor 90 at that section. In column 92c, the element in the row aligned with arrow 92d is zero, indicating that infeed conveyor 92 is not actively transferring a case onto collector conveyor 90, and concomitantly there is no case length rate associated with that element. In FIG. 5, the last representation of one or more cases transferred to collector conveyor 90 from infeed conveyor 92 is case representation 100, with case representation 102 being just ahead of case representation 100. There are three elements in column 92c aligned with case representations 100 and 102, containing (in the direction of travel order) data indicating that the corresponding section of collector conveyor 90 is at 25 CFPM, 30 CFPM and 15 CFPM (due to infeed conveyor 92). The element indicating 25 CFPM means that infeed conveyor 92 is under performing at that section by 5 CFPM yielding unused capacity of 65 CFPM for collector conveyor 90. Similarly, 30 CFPM indicates the desired performance, and 15 CFPM indicates under performance of 15 CFPM yielding unused capacity of 75 CFPM. In this control approach, the speed of the closest conveyor which is aligned with, or downstream relative to, the elements in column 92c aligned with case representations 100 and 102 (i.e., infeed conveyor 94) would be momentarily increased by applying a speed ratio calculated based on the unused capacity to one or more downstream infeed conveyors (including infeed conveyor 94), such as by allocating the unused capacity of collector conveyor 90 equally across the remaining infeed conveyors (e.g., obtaining a modification value by dividing the unused capacity by a number of downstream controllable infeed conveyors, then subtracting the modification value from the desired case length rates for the downstream controlled infeed conveyors), or allocating all to the next downstream infeed conveyor.

FIG. 5 specifically illustrates there are no cases located at arrow 94d. Using the calculation described above, the sum of the desired case length rate of infeed conveyor 94 and all upstream infeed conveyors (infeed conveyor 92) desired case rate is 60 CFPM Since the actual case length rate at arrow 94d is zero, the momentary desired case length rate for infeed conveyor 94 is set to 60 CFPM which is the sum of the desired case length rate for upstream infeed conveyor 92 (i.e., 30 CFPM) and the desired case length rate for infeed conveyor 94 (i.e., 30 CFPM) less the actual case length rate at arrow 94d (i.e., 0 CFPM).

Similarly, case representation 104, corresponds to a range of elements (containing data indicative of 29 CFPM, 28 CFPM and 32 CFPM for infeed conveyor 92) spans the processing point for infeed conveyor 96, and case representation 106, corresponds to a range of elements (containing data indicative of 25 CFPM and 33 CFPM for infeed conveyor 94) ends at the processing point for infeed conveyor 96. At the processing point aligned with arrow 96d, infeed conveyor 92 is under performing by 1 CFPM and infeed conveyor 94 is over performing by 3 CFPM, leaving 28 CFPM unused capacity for collector conveyor 90. In this control approach, the speed of infeed conveyor 96 would be momentarily decreased by applying a speed ratio calculated to result in infeed conveyor 96 delivering 28 CFPM (30 CFPM+30 CFPM+30 CFPM−29 CFPM−33 CFPM).

Figure 6:
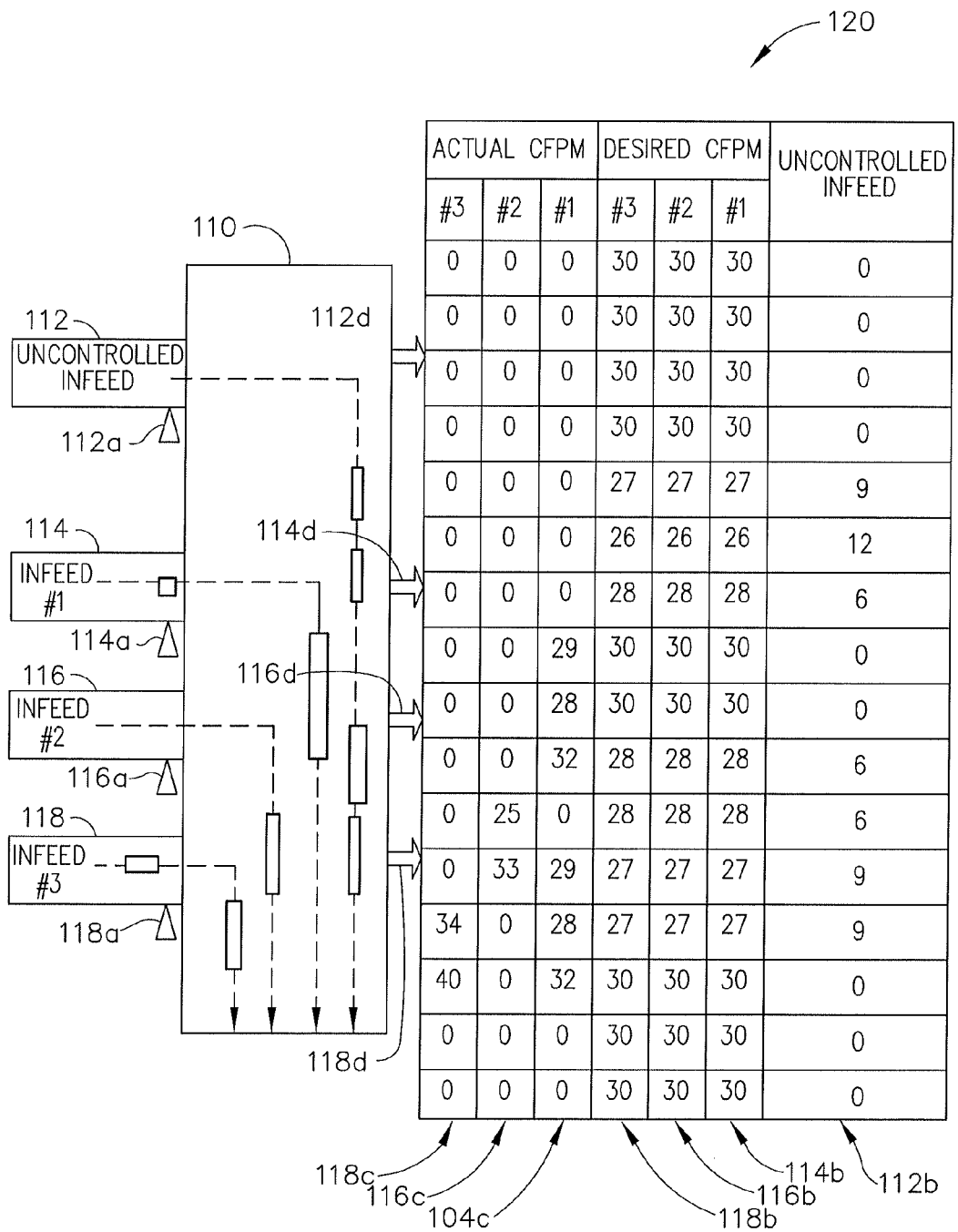
FIG. 6 illustrates a collector conveyor fed by an uncontrolled infeed conveyor and a plurality of controllable infeed conveyors, and an associated tracking array.

FIG. 6 depicts the preceding control approach when the system includes an uncontrolled infeed conveyor 112. In this embodiment, the actual contributions from one or more uncontrolled infeed conveyors 112 are tracked in addition to the tracking of the actual contributions of controllable infeed conveyors 114, 116 and 118, which reduces the case length rate capacity available to the controllable infeed conveyors 114, 116 and 118. In array 120 of FIG. 6, column 112b reflects actual case length rate contributed by uncontrolled infeed conveyor 112, such as a recirculation line, which is depicted upstream of the controllable infeed conveyors. Any such actual case length rate reduces the total desired case length rate available to be contributed by infeed conveyors 114, 116 and 118. As a formula:

$$CFPM_{Remaining} = CFPM_{Desired} - CFPM_{Uncontrolled\ Infeed\ Actual}$$

After deducting for the actual case length rate contributed by an uncontrolled infeed conveyor, $CFPM_{Uncontrolled\ Infeed\ Actual}$, the remaining collector case length rate, $CFPM_{Remaining}$, may be allocated to each individual controllable infeed conveyor in any suitable manner, such as according to the formula:

$$CFPM_{Adjusted\ Controllable\ Infeed} = \frac{CFPM_{Remaining}}{CFPM_{Desired}} \times CFPM_{Original\ Controllable\ Infeed}$$

Although FIG. 6 illustrates a single uncontrolled infeed conveyor, a plurality of uncontrolled infeed conveyors may be accommodated. If there is an intermediate uncontrolled infeed conveyor which contributes to the collector conveyor downstream of any controllable infeed, the adjustment of the desired case length rates is calculated according to the same principle. The desired case length rate for the portion of the collector conveyor downstream of the intermediate uncontrolled infeed conveyor, $CFPM_{Remaining}$, is determined by the desired case length rate for the entire collector conveyor, $CFPM_{Desired}$, reduced by the actual case length rate of all upstream infeed conveyors, uncontrolled and controllable according to the formula:

$$CFPM_{Remaining} = CFPM_{Desired} - CFPM_{Uncontrolled\ \&\ Controlled\ Infeed\ Actual}$$

at the intermediate uncontrolled infeed conveyor.

By way of illustration, individual elements of column 112b located immediately upstream of infeed conveyor 114 processing location (indicated at arrow 114d) illustrate that uncontrolled infeed conveyor 112 has contributed 9 CFPM, 12 CFPM and 6 CFPM (in the row aligned with arrow 114d) to the corresponding sections of collector conveyor 110. In the row corresponding to the element of column 112b indicating 9 CFPM, it can be seen that the desired case length rate contribution from each infeed conveyor 114, 116 and 118 has been reduced evenly to 27 CFPM. In the row corresponding to the element of column 112b indicating 12 CFPM, it can be seen that the desired case length rate contribution from each infeed conveyor 114, 116 and 118 has been reduced evenly to 26 CFPM. In the row corresponding to the element of column 112b indicating 6 CFPM, it can be seen that the desired case length rate contribution from each infeed conveyor 114, 116 and 118 has been reduced evenly to 28 CFPM.

Another example of the application of this control approach is illustrated at the row aligned with arrow 116d of FIG. 6. There is no contribution from uncontrolled infeed conveyor 112, leaving the desired case length rate for each controllable infeed conveyor at 30 CFPM. Array 120 indicates that upstream infeed conveyor 114 has actually contributed 28 CFPM. The sum of the desired case length rate of infeed conveyor 116 and all upstream controllable infeed conveyors (infeed conveyor 114) is 60 CFPM (30 CFPM+30 CFPM). Subtracting the actual case length rate for all upstream controllable infeed conveyors (28 CFPM), the momentary desired case length rate for infeed conveyor 116 may be set at 32 CFPM.

For infeed conveyor 118, at arrow 118d, the sum of the desired case length rate of infeed conveyor 118 and all upstream controllable infeed conveyors (infeed conveyors 116 and 114) is 81 CFPM (accounting for actual case length rate of uncontrolled infeed conveyor 112). Subtracting the actual case length rate for all upstream controllable infeed conveyors, (the 33 CFPM of infeed conveyor 116), the momentary desired case length rate for infeed conveyor 118 may be set at 48 CFPM. It should be noted that, while FIG. 6 illustrates the momentary desired case length rates (i.e., the elements in columns 114b, 116b and 118b) being updated immediately based on the actual case length rate information for the uncontrolled infeed, it is also possible that, as is the case for the controlled infeeds, the actual case length rate information for the uncontrolled infeed could be stored in the tracking array 120 (or in another memory location, such as a memory within a controller) and only used to calculate a momentary desired case length rate when the relevant portion of the collector conveyor 110 was being processed by one of the controlled inputs.

In the embodiment depicted in FIG. 6, uncontrolled infeed conveyor 112 is disposed upstream of all controllable infeed conveyors 114, 116 and 118. As mentioned above, multiple uncontrolled infeed conveyors may be used, such as intermediate controllable infeed conveyors. The teachings of the present disclosure are also applicable when an uncontrolled infeed conveyor is located downstream of all controllable infeed conveyors. In such a configuration, the uncontrollable infeed conveyor could contribute too much to the collector conveyor case length rate, raising the collector conveyor case length rate above the capacity of the downstream conveyor system (e.g., a singulator conveyor). Applying the teachings of the present disclosure, the contributions of the upstream controllable infeed conveyors may be immediately modified, so as to reduce the average case length rate of a time period or length that includes the portion of the collector conveyor downstream of the last uncontrolled infeed conveyor and a portion of the downstream conveyor system. As long as the time period or length over which the average is taken is compatible with the requirements of the downstream conveyor, consequences of any instantaneous overfeeding can be avoided by the reduction in the upstream average case length rate reaching the downstream conveyor system.

In the embodiments and control approaches described above, a controllable infeed conveyor disposed upstream has more opportunity to release cases than controllable infeed conveyors disposed upstream because capacity not utilized by upstream controllable infeed conveyors is available to the downstream controllable infeed conveyor. This can be seen from the discussion of FIG. 6 above, in which it is pointed out that the momentary desired case length rate for infeed conveyor 116 may be set at 32 CFPM when the actual case length rate at the row aligned with arrow 116d is 28 compared to the momentary desired case length rate for downstream infeed conveyor 118 which may be set at 48 CFPM when the actual case length rate of the upstream controlled infeed conveyors at the row aligned with arrow 60d is 33 CFPM.

In an embodiment, balancing of the controllable infeed conveyors is implemented. One approach is premised on the presumption that each controllable infeed conveyor will deliver, over a period of time, an equal number of cases. In this type of approach, the number of cases delivered by each controllable infeed can be tracked, and the desired case length rates for the controlled infeeds modified so that balance between them is achieved over a long period of time (e.g., if one controllable infeed has delivered a relatively low number of cases, then an embodiment of the disclosed technology could be configured to allocate all unused capacity to that controlled infeed, rather than allocating unused capacity among that infeed and one or more downstream infeeds, until the imbalance was alleviated). Under another approach, for batching systems in which the quantity of cases per controllable infeed conveyor is a known quantity, with the goal of having each controllable infeed conveyor finish its contribution at the same time, the momentary case length rates can be assigned to each controllable infeed conveyor based on the remaining cases to be delivered by that conveyor. In either case, these balanced momentary case length rates can be treated in the same manner as desired momentary case length rates determined without balancing, and so can be determined, or processed, using the same approaches as described herein for other case length rates.

When a controllable infeed conveyor is operating at a desired average case length rate, the actual case length rate may be different. A gain value (desired/actual) can be determined for each controllable infeed conveyor by measuring the actual case length rate when the conveyor is operating at the desired rate. The gain can be applied for each controllable infeed conveyor according to the formula:

$$CFPM = Gain \times \frac{FPM \times CF}{L}$$

An aspect includes taking into account requirements of downstream systems or devices. A sortation conveyor provides an example of downstream requirements. A sortation conveyor requires sufficient gap between cases in order to sort. Although upstream of a sortation conveyor there may be a gap optimizer that sets the inter-case gap to the necessary gap, on the average, the gap optimizer must be supplied with enough gap on the average to correct the gap per case. One control approach of the present disclosure is to account for trailing gap (e.g., treating each case as having a length 2 inches greater than its actual length, so that there will, on average be an extra two inches of gap on each case) in determining and acting on the case length rate.

Figure 7:
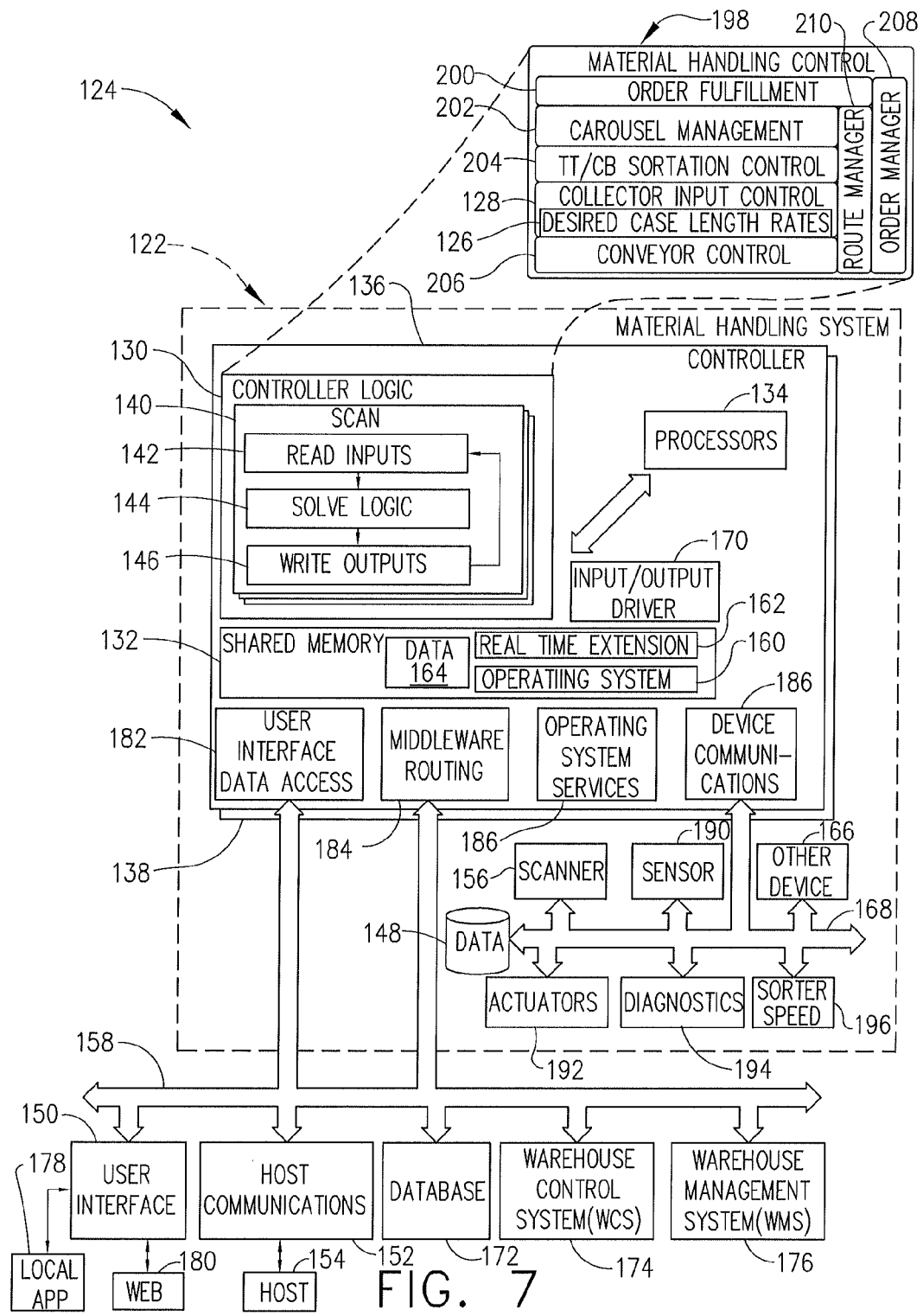
FIG. 7 illustrates an exemplary material handling system of a distribution center processing architecture.

In FIG. 7, an exemplary material handling system 122 of a distribution center processing architecture 124 is depicted wherein determination of desired case length rates 126 is implemented within a collector input control 128. Controller logic 130 stored in computer-readable, shared memory 132 is executed by processors 134 in a controller 136 of the material handling system 122. One function of the controller logic 130 can be machine control logic. The controller 136 can be a primary controller supported by a backup controller 138 such that maintenance personal could swap cables or connections in the event of a failure without undue service downtime. Alternatively, a supervising system or the self-diagnostics could cause automatic switching between primary and backup in the event of a failure.

Scan logic, or merely a scan 140 refers to an implementation within the controller logic 130 wherein the processors 134 repeatedly execute a read input component 142, a solve logic component 144, and a write outputs component 146. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 144 can incorporate IF-THEN-ELSE branching logic, motion control, simple to sophisticated, hardcoded to configured. Data, used by the solve logic component 144, can reside in the computer-readable, shared memory 132 or a data store device 148 (e.g., local, remote, cloud-based, etc.). A user interface 150 can be used to modify the solve logic component 144 such as by changing values that change the configuration or operation.

As is conventionally understood, the controller logic 130 can receive binary type inputs (e.g., switches, photo eyes, etc.) and generate binary type outputs (e.g., motor contacts, solenoid valves, lamp actuations, etc.). For example, in such an implementation, the user interface 150 can entail at least in part push button controls and lamps. More recent developments for controller logic 130 can include RS232 serial devices with cathode ray tube (CRT) screens and keyboards that enable dialog screens and data display along with printers for generating reports. Barcode scanning can detect items processed by the material handling system 122. More recently, wired and wireless communication within the material handling system 122 and distribution center processing architecture 124 enable more distributed and remotely isolcated implementations. For example, such communication architectures may employ bus couplers such a PROFIBUS and ETHERCAT.

The scan 140 can be one of many control scans to support increased speeds and complexities for portions of the material handling system 122. Certain logic is required to be performed during shorter intervals than others and so the scans 140 can have different periodicities, often selected for convenience to occur as multiples of the shortest duration scan 140. Examples include scans 140 of 1 ms and 2 ms for motion control, 5 ms for a merge subsystem, and 25 ms for general conveyor.

The material handling system 122 can incorporate host communications 152 to a host system 154 using serial ports, Ethernet, file transfer protocol (FTP), Transfer Control Protocol/Internet Protocol (TCP/IP), etc. Thereby, the host system 154 can make decisions for the material handling system 122. For example, a scanner 156 can see a barcode. The barcode is sent to the host system 154, such as via a bridge 158. The host system 154 responds with a destination. In response, the material handling system 122 causes the item with the barcode to go to that destination. Alternatively, the process can entail receiving a batch or download of destinations mapped to barcodes as part of a lookup table (LUT) for reference by the material handling system 122.

The computer-readable shared memory 132 can allow execution of an operating system (e.g., Windows, LINX, etc.) 160 to execute with a real time extension 162. The real time extension 162 assures that the machine control logic (controller logic 130) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 164 from these communications is stored in computer-readable shared memory 132 for use in control decisions and for display on user interface 150. In an exemplary version, the data 164 is not controlled by the real time extension 162. In a similar fashion, other communicating devices 166 used in the control process (e.g., scales, printers) are connected via a private internal communications bus (e.g., Ethernet) 168 to the processors 134. The controller 136 can also have internal input/output drivers 170 to interface using specific communication protocols.

The distribution center processing architecture 124 can include other systems external to the material handling system 122 that communicate via the bridge 158, such as a database 172, a warehouse control system (WCS) 174, and a warehouse management system (WMS) 176. In addition, the user interface 150 can facilitate remote or automated interaction via the user interface 150, depicted as a local application 178 and a web application 180. The controller 136 can include specific interfaces to support this interaction, such as a user interface data access component 182 to interact with user interface 150, middleware routing component 184 to interface with other external systems. Operating system services 186 and a device communication component 188 can also support the communications, such as sensors 190, actuators 192, diagnostic systems 194, and a sorter speed control 196.

The controller logic 130 can be functional described as material handling control layers 198 of software functionality, such as the sortation control 128, that address certain subsystems within a distribution center: order fulfillment 200, carousel management 202, tilt tray/cross belt (TT/CB) control 204, conveyor control 206, order manager 208 and route manager 210.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. The computer-readable medium may be a non-transitory computer-readable medium. Non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The non-transitory computer-readable medium may be resident in the processing system, external to the processing system, or distributed across multiple entities including the processing system. The non-transitory computer-readable medium may be embodied in a computer-program product. By way of example, a computer-program product may include a non-transitory computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

"Determining" should be understood to refer to generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a database or a sensor) as being a thing would be an example of "determining" the thing (e.g., storing a number in a variable representing a desired run rate of a collector conveyor would be an example of "determining" the desired run rate of the collector conveyor).

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

A statement that something is "based on" something else should be understood to mean that something is determined at least in part by the thing that it is indicated as being "based on." When something is completely determined by a thing, it will be described as being "based EXCLUSIVELY on" the thing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the preferred embodiment, specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. A method for controlling inputs to a collector conveyor, wherein the inputs to the collector conveyor comprise a plurality of inputs, the plurality of inputs comprising at least one controlled input and one or more other inputs, the one or more other inputs comprising a controlled input and/or an uncontrolled input, wherein each of the inputs is a material handling system component for delivering cases onto the collector conveyor, the method comprising:
  determining a desired case length rate for the collector conveyor, wherein the desired case length rate for the collector conveyor is a length of cases per unit time;
  determining a set speed for delivering cases from one controlled input of the plurality of inputs to the collector conveyor based on the desired case length rate and case length rate information for one or more of the other of the plurality of inputs to the collector conveyor, wherein the case length rate information comprises a length rate for discharging cases to the collector conveyor from one of the other of said plurality of inputs; and
  operating the one controlled input at the set speed.

2. The method of claim 1, wherein each controlled input of the plurality of inputs has a respective nominal speed, and wherein determining the set speed for delivering cases from one controlled input to the collector conveyor based on the desired case length rate and case length rate information for one or more of the other of the plurality of inputs to the collector conveyor comprises dividing:
  a desired total controlled input case length rate wherein the desired total controlled input case length rate is a total length of cases per unit time to be delivered to the collector conveyor from all of the controlled inputs of the plurality of inputs; by
  a sum comprising an expected case length rate for each controlled input of the plurality of inputs when each controlled input is operated at its respective nominal speed.

3. The method of claim 2, wherein the desired total controlled input case length rate is equal to the desired case length rate, and wherein the plurality of inputs does not include an uncontrolled input having an expected case length rate greater than zero.

4. The method of claim 2, wherein the plurality of inputs comprises one or more uncontrolled inputs, and wherein the desired total controlled input case length rate is determined based on subtracting a second sum comprising an expected case length rate contribution for each of the one or more uncontrolled inputs of the plurality of inputs from the desired case length rate.

5. The method of claim 4, wherein the one controlled input for which the set speed is determined is a controlled infeed conveyor, and the one or more uncontrolled inputs comprises a recirculation line for transporting cases from a singulator located downstream of the collector conveyor to the collector conveyor.

6. The method of claim 1, further comprising:
  determining a modified speed for the one controlled input for which the set speed is determined to adjust the one controlled input for which the set speed is determined's actual case length rate to match an expected case length rate for the one controlled input for which the set speed is determined at the set speed; and
  operating the one controlled input for which the set speed is determined at the modified speed.

7. The method of claim 1, further comprising:
  receiving measured case length rate information corresponding to a location on the collector conveyor;
  determining a momentary desired case length rate corresponding to the location on the collector conveyor based on a relationship indicated by the measured case length rate information between actual and predetermined case length rates for one of the other of the plurality of inputs when the location on the collector conveyor is proximate to a discharge end of that one of the other of the plurality of inputs; and
  operating the one controlled input for which the set speed is determined at a speed determined to deliver cases to the collector conveyor at the momentary desired case length rate corresponding to the location on the collector conveyor, when the location on the collector conveyor is located proximate to a discharge end of the one controlled input for which the set speed is determined.

8. The method of claim 7, comprising: receiving measured case length rate information corresponding to the location on the collector conveyor two or more times prior to operating the one controlled input for which the set speed is determined at the speed determined to deliver cases to the collector conveyor at the momentary desired case length rate, wherein each instance of receiving measured case length rate information corresponding to the location on the collector conveyor comprises receiving measured case length rate information for a different input other than the one controlled input for which the set speed is determined.

9. The method of claim 8, wherein determining the momentary desired case length rate corresponding to the location on the collector conveyor based on the relationship indicated by the measured case length rate information between actual and predetermined case length rates for one of the other of the plurality of inputs when the location on the collector conveyor is proximate to the discharge end of that one of the other of the plurality of inputs comprises determining the momentary desired case length rate corresponding to the location on the collector conveyor based on both:
  the relationship indicated by the measured case length rate information between actual and predetermined case length rates for that one of the other of the plurality of inputs when the location on the collector conveyor is proximate to the discharge end of that one of the other of the plurality of inputs; and
  a relationship indicated by subsequently received measured case length rate information between actual and predetermined case length rates for another of the other of the plurality of inputs when the location on the collector conveyor is proximate to the discharge end of the another of the other of the plurality of inputs.

10. The method of claim 7, wherein determining the momentary desired case length rate corresponding to the location on the collector conveyor comprises:
  determining a modification value by dividing:
    a discrepancy between the actual and predetermined case length rates for one of the other of the plurality of inputs when the location on the collector conveyor is proximate to the discharge end of that one of the other of the plurality of inputs; by
    a number determined based on a number of controlled inputs having discharge ends downstream of the one controlled input for which the set speed is determined; and subtracting the modification value from an expected case length rate for that one controlled input at the set speed.

11. A controller to control inputs to a collector conveyor, wherein the inputs to the collector conveyor comprise a plurality of inputs, the plurality of inputs comprising at least one controlled input and one or more other inputs, the one or more other inputs comprising a controlled input and/or an uncontrolled input, wherein each of the inputs is a material handling system component for delivering cases onto the collector conveyor, the controller comprising:
   an interface in communication with one controlled input of the plurality of inputs;
   at least one processor to control the controlled input via the interface to perform operations comprising:
      determine a desired case length rate for the collector conveyor, wherein the desired case length rate for the collector conveyor is a length of cases per unit time;
      determine a set speed for delivering cases from the one controlled input of the plurality of inputs to the collector conveyor based on the desired case length rate and case length rate information for one or more of the other of the plurality of inputs to the collector conveyor wherein the case length rate information comprises a length rate for discharging cases to the collector conveyor from one of the other of said plurality of inputs; and
      operate the one controlled input at the set speed determined for the controlled input.

12. The controller of claim 11, wherein each controlled input of the plurality of inputs has a respective nominal speed, and wherein determining the set speed for delivering cases from the one controlled input to the collector conveyor based on the desired case length rate and case length rate information for one or more of the other of the plurality of inputs to the collector conveyor comprises dividing:
   a desired total controlled input case length rate wherein the desired total controlled input case length rate is a total length of cases per unit time to be delivered to the collector conveyor from all of the controlled inputs of the plurality of inputs; by
   a sum comprising an expected case length rate for each controlled input of the plurality of inputs when each controlled input is operated at its respective nominal speed.

13. The controller of claim 12, wherein the desired total controlled input case length rate is equal to the desired case length rate, and wherein the plurality of inputs does not include an uncontrolled input having an expected case length rate greater than zero.

14. The controller of claim 12, wherein the plurality of inputs comprises one or more uncontrolled inputs, and wherein the desired total controlled input case length rate is determined based on subtracting a second sum comprising an expected case length rate contribution for each of the one or more uncontrolled inputs of the plurality of inputs from the desired case length rate.

15. The controller of claim 14, wherein the one controlled input for which the set speed is determined is a controlled infeed conveyor, and the one or more uncontrolled inputs comprises a recirculation line for transporting cases from a singulator located downstream of the collector conveyor to the collector conveyor.

16. The controller of claim 11, wherein the at least one processor further performs operations comprising:
   determine a modified speed for the one controlled input for which the set speed is determined to adjust the one controlled input for which the set speed is determined's actual case length rate to match an expected case length rate for the one controlled input for which the set speed is determined at the set speed; and
   operate the one controlled input for which the set speed is determined at the modified speed.

17. The controller of claim 11, wherein the at least one processor further performs operations comprising:
   receive measured case length rate information corresponding to a location on the collector conveyor;
   determine a momentary desired case length rate corresponding to the location on the collector conveyor based on a relationship indicated by the measured case length rate information between actual and predetermined case length rates for one of the other of the plurality of inputs when the location on the collector conveyor is proximate to a discharge end of that one of the other of the plurality of inputs; and
   operate the one controlled input for which the set speed is determined at a speed determined to deliver cases to the collector conveyor at the momentary desired case length rate corresponding to the location on the collector conveyor, when the location on the collector conveyor is located proximate to a discharge end of the one controlled input for which the set speed is determined.

18. The controller of claim 17, wherein the at least one processor further performs operations comprising receive measured case length rate information corresponding to the location on the collector conveyor two or more times prior to operating the one controlled input for which the set speed is determined at the speed determined to deliver cases to the collector conveyor at the momentary desired case length rate, wherein each instance of receiving measured case length rate information corresponding to the location on the collector conveyor comprises receiving measured case length rate information for a different input other than the one controlled input for which the set speed is determined.

19. The controller of claim 18, wherein determining the momentary desired case length rate corresponding to the location on the collector conveyor based on the relationship indicated by the measured case length rate information between actual and predetermined case length rates for one of the other of the plurality of inputs when the location on the collector conveyor is proximate to the discharge end of that one of the other of the plurality of inputs comprises determining the momentary desired case length rate corresponding to the location on the collector conveyor based on both:
   the relationship indicated by the measured case length rate information between actual and predetermined case length rates for that one of the other of the plurality of inputs when the location on the collector conveyor is proximate to the discharge end of that one of the other of the plurality of inputs; and
   a relationship indicated by subsequently received measured case length rate information between actual and predetermined case length rates for another of the other of the plurality of inputs when the location on the collector conveyor is proximate to the discharge end of the another of the other of the plurality of inputs.

20. The controller of claim 17, wherein determining the momentary desired case length rate corresponding to the location on the collector conveyor comprises:
   determining a modification value by dividing:
      a discrepancy between the actual and predetermined case length rates for the one of the other of the plurality of inputs when the location on the collector conveyor is proximate to the discharge end of that one of the other of the plurality of inputs; by a number determined based on a number of controlled inputs having discharge ends downstream of the location on the collector conveyor; and subtracting the modification value from an expected case length rate for that one controlled input at the set speed.

21. A material handling system comprising:
a collector conveyor;
a plurality of inputs to the collector conveyor, the plurality of inputs to the collector conveyor comprising at least one controlled input and one or more other inputs, the one or more other inputs comprising a controlled input and/or an uncontrolled input, wherein each of the inputs is a component of the material handling system for delivering cases onto the collector conveyor;
a controller in communication with components of the material handling system comprising one controlled input of the plurality of inputs to perform operations comprising:
    determine a desired case length rate for the collector conveyor, wherein the desired case length rate for the collector conveyor is a length of cases per unit time;
    determine a set speed for delivering cases from the one controlled input of the plurality of inputs to the collector conveyor based on the desired case length rate and case length rate information for one or more of the other of the plurality of inputs to the collector conveyor wherein the case length rate information comprises a length rate for discharging cases to the collector conveyor from one of the other of said plurality of inputs; and
    operate the one controlled input at the set speed determined for the one controlled input.

22. The material handling system of claim 21, wherein each controlled input of the plurality of inputs has a respective nominal speed, and wherein determining the set speed for delivering cases from the one controlled input to the collector conveyor based on the desired case length rate and case length rate information for one or more of the other of the plurality of inputs to the collector conveyor comprises dividing:
    a desired total controlled input case length rate wherein the desired total controlled input case length rate is a total length of cases per unit time to be delivered to the collector conveyor from all of the controlled inputs of the plurality of inputs; by
    a sum comprising an expected case length rate for each controlled input of the plurality of inputs when each controlled input is operated at its respective nominal speed, wherein the sum comprises the expected case length rate for each controlled input of the plurality of inputs is not bounded by the desired case length rate.

23. The material handling system of claim 22, wherein the desired total controlled input case length rate is equal to the desired case length rate, and wherein the plurality of inputs does not include an uncontrolled input having an expected case length rate greater than zero.

24. The material handling system of claim 22, wherein the plurality of inputs comprises one or more uncontrolled inputs, and wherein the desired total controlled input case length rate is determined based on subtracting a second sum comprising an expected case length rate contribution for each of the one or more uncontrolled inputs of the plurality of inputs from the desired case length rate.

25. The material handling system of claim 24, wherein the one controlled input for which the set speed is determined is a controlled infeed conveyor, and the one or more uncontrolled inputs comprises a recirculation line for transporting cases from a singulator located downstream of the collector conveyor to the collector conveyor.

26. The material handling system of claim 21, wherein the controller further performs operations comprising:
    determine a modified speed for the one controlled input for which the set speed is determined to adjust the one controlled input for which the set speed is determined's actual case length rate to match an expected case length rate for the one controlled input for which the set speed is determined at the set speed; and
    operate the one controlled input for which the set speed is determined at the modified speed.

27. The material handling system of claim 21, wherein the controller further performs operations comprising:
    receive measured case length rate information corresponding to a location on the collector conveyor;
    determine a momentary desired case length rate corresponding to the location on the collector conveyor based on a relationship indicated by the measured case length rate information between actual and predetermined case length rates for one of the other of the plurality of inputs when the location on the collector conveyor is proximate to a discharge end of that one of the other of the plurality of inputs; and
    operate the one controlled input for which the set speed is determined at a speed determined to deliver cases to the collector conveyor at the momentary desired case length rate corresponding to the location on the collector conveyor, when the location on the collector conveyor is located proximate to a discharge end of the one controlled input for which the set speed is determined.

28. The material handling system of claim 27, wherein the controller further performs operations comprising receive measured case length rate information corresponding to the location on the collector conveyor two or more times prior to operating the one controlled input for which the set speed is determined at the modified speed determined to deliver cases to the collector conveyor at the momentary desired case length rate, wherein each instance of receiving measured case length rate information corresponding to the location on the collector conveyor comprises receiving measured case length rate information for a different input other than the one controlled input for which the set speed is determined.

29. The material handling system of claim 27, wherein determining the momentary desired case length rate corresponding to the location on the collector conveyor comprises:
    determining a modification value by dividing:
        a discrepancy between the actual and predetermined case length rates for the one of the other of the plurality of inputs when the location on the collector conveyor is proximate to the discharge end of that one of the other of the plurality of inputs; by
        a number determined based on a number of controlled inputs having discharge ends downstream of the location on the collector conveyor; and
    subtracting the modification value from an expected case length rate for that one controlled input at the set speed.

* * * * *